(12) United States Patent
Amano

(10) Patent No.: US 9,109,484 B2
(45) Date of Patent: Aug. 18, 2015

(54) CONTROL SYSTEM FOR DPF REGENERATION BY EXHAUST PIPE INJECTION, AND REGENERATION METHOD

(75) Inventor: Takafumi Amano, Saitama (JP)

(73) Assignee: UD TRUCKS CORPORATION, Ageo-shi (JP)

( * ) Notice: Subject to any disclaimer, the term of this patent is extended or adjusted under 35 U.S.C. 154(b) by 0 days.

(21) Appl. No.: 14/348,650

(22) PCT Filed: Jul. 30, 2012

(86) PCT No.: PCT/JP2012/069292
§ 371 (c)(1),
(2), (4) Date: Mar. 31, 2014

(87) PCT Pub. No.: WO2013/077028
PCT Pub. Date: May 30, 2013

(65) Prior Publication Data
US 2014/0223889 A1 Aug. 14, 2014

(30) Foreign Application Priority Data
Nov. 22, 2011 (JP) ................. 2011-254544

(51) Int. Cl.
*F01N 3/025* (2006.01)
*F01N 3/023* (2006.01)
*F01N 9/00* (2006.01)
*F01N 11/00* (2006.01)

(52) U.S. Cl.
CPC .............. *F01N 3/023* (2013.01); *F01N 3/0235* (2013.01); *F01N 3/0238* (2013.01); *F01N 3/0253* (2013.01); *F01N 9/002* (2013.01); *F01N 11/002* (2013.01); *B60W 2510/068* (2013.01); *B60W 2720/10* (2013.01);
(Continued)

(58) Field of Classification Search
CPC ..... F01N 3/0235; F01N 3/0253; F01N 9/002; F01N 2260/14; F01N 2560/06; F01N 2560/08; F01N 2610/03; F01N 2610/146; F01N 2610/148; F01N 2900/1404; F01N 2900/1606
USPC ........... 60/274, 277, 286, 291, 295, 297, 300, 60/303, 311, 320, 324
See application file for complete search history.

(56) References Cited

U.S. PATENT DOCUMENTS

2008/0034737 A1* 2/2008 Otsubo et al. ................... 60/292
2011/0252765 A1 10/2011 Makartchouk et al.

FOREIGN PATENT DOCUMENTS

| JP | 2001-303980 A1 | 10/2001 |
| JP | 2003-193824 A1 | 7/2003 |
| JP | 2009-41514 A1 | 7/2003 |
| JP | 2005-282545 A1 | 10/2005 |

(Continued)

OTHER PUBLICATIONS

International Search Report for International Application No. PCT/JP2012/069292 dated Oct. 9, 2012.

*Primary Examiner* — Thomas Denion
*Assistant Examiner* — Jorge Leon, Jr.
(74) *Attorney, Agent, or Firm* — Kratz, Quintos & Hanson, LLP

(57) ABSTRACT

The purpose of the present invention is to provide a DPF travel-time regeneration control system of stably raising the temperature even during travel and capable of decreasing the frequency of DPF regeneration when the vehicle is stopped. In this control system, if the DPF (5) needs to be regenerated, the vehicle is traveling on cruise control, and the exhaust temperature detected by an exhaust temperature sensor (11) is higher than a threshold value, then fuel is injected into the exhaust pipe by a fuel injection means (7), and if the exhaust temperature is lower than the threshold value, the exhaust temperature is raised by operating the exhaust brake without injecting fuel into the exhaust pipe.

2 Claims, 3 Drawing Sheets

(52) U.S. Cl.
CPC ........ *F01N 2240/36* (2013.01); *F01N 2260/14* (2013.01); *F01N 2560/06* (2013.01); *F01N 2560/08* (2013.01); *F01N 2610/03* (2013.01); *F01N 2610/146* (2013.01); *F01N 2610/148* (2013.01); *F01N 2900/10* (2013.01); *F01N 2900/102* (2013.01); *F01N 2900/1404* (2013.01); *F01N 2900/1606* (2013.01); *Y02T 10/47* (2013.01)

(56) References Cited

FOREIGN PATENT DOCUMENTS

| | | |
|---|---|---|
| JP | 2009-154620 A1 | 7/2009 |
| JP | 2008-82292 A | 4/2010 |
| JP | 2010-12531 A1 | 6/2010 |
| JP | 2011-111949 A1 | 6/2011 |

* cited by examiner

CONTROL SYSTEM FOR DPF REGENERATION BY EXHAUST PIPE INJECTION, AND REGENERATION METHOD

TECHNICAL FIELD

The present invention relates to technology for regenerating a diesel particulate filter (DPF) by injecting fuel into an exhaust pipe in a diesel engine equipped vehicle during travel of the vehicle.

BACKGROUND ART

As DPF regeneration technologies in a diesel engine equipped vehicle, technology for raising an exhaust temperature by post injection (fuel injection using a delayed injection timing for raising a exhaust temperature) into an engine cylinder using an injector and technology for raising a temperature by directly injecting fuel into an exhaust pipe are well known.

However, the former (the post injection into the engine cylinder using the injector) has a problem of dilution of an engine lubricating oil (so-called "oil dilution.") caused by injection of the fuel into the cylinder.

On the other hand, the latter (direct injection of the fuel into the exhaust pipe) has a difficulty in stably increasing an exhaust temperature due to a fluctuation of a load during travel, and there is a problem that the DPF regeneration can be carried out only when a vehicle is stopped.

As the prior art, technology concerning the DPF regeneration is also suggested (refer to Patent Literature 1 and Patent Literature 2), and technology for detecting stoppage of a vehicle and raising a temperature with the use of an exhaust brake is disclosed, for example (refer to Patent Literature 2).

However, both the prior arts (Patent Literature 1 and Patent Literature 2) do not disclose DPF regeneration technology for stably raising an exhaust temperature during travel.

CITATION LIST

Patent Literatures

Patent Literature 1: Japanese Patent Application Non-examined Publication Gazette No. 2011-111043 (JPA 2011-111040)

Patent Literature 2: Japanese Patent Application Non-examined Publication Gazette No. 2005-282545 (JPA 2005-282545)

SUMMARY OF INVENTION

Problem be Solved by the Present Invention

In view of the above-described problem of the prior arts, it is an object of the present invention to provide a DPF regeneration system, and a DPF regeneration method capable of stably raising an exhaust temperature and regenerating a DPF even during travel of a vehicle.

Solution to Problem

There is provided a DPF regeneration system according to the present invention, the (travel-time) DPF regeneration system based on in-exhaust-pipe fuel injection in a diesel engine equipped vehicle, comprising:

an operation device (an auto cruise operation switch 13) that enables a vehicle to travel on cruise control, an exhaust brake (6) and a fuel injection means (7) being disposed to the exhaust pipe (3), a DPF (5) being disposed in a region on, the downstream side of the fuel injection means (7), an exhaust temperature sensor (11) being disposed in a region on the upstream side of the DPF (5), pressure sensors (12, 12) being disposed on the upstream side and the downstream side of the DPF (5), and a control unit (10) that controls the exhaust brake (6) and the fuel injection means (7) in response to detection signals from the exhaust temperature sensor (11) and the pressure sensors (12) being provided, Wherein the control unit (10) has:

a function to inject fuel into the exhaust pipe (3) by the fuel injection means (7) when a differential pressure between the upstream side and the downstream side of the DPF (5) measured by the pressure sensors (12, 12) is equal to or more than a threshold value, the vehicle is traveling on cruise control (the auto cruise operation switch 13 is operated), and an exhaust temperature detected by the exhaust temperature sensor (11) is higher than a threshold value; and a function to operate (without injecting fuel into the exhaust pipe (3)) the exhaust brake (to raise the exhaust temperature) when the differential pressure is equal to or more than the threshold value and die vehicle is traveling on cruise control but the exhaust temperature is lower than the threshold value.

Further, there is provided a DPF regeneration method according to the present invention, the DPF regeneration method being based on in-exhaust-pipe fuel injection in a diesel engine equipped vehicle in which an exhaust brake (6) and a fuel injection means (7) are disposed to the exhaust pipe (3), a DPF (5) is disposed in a region on the downstream side of the fuel injection means (7), an exhaust temperature sensor (11) is disposed in a region on the upstream side of the DPF (5), and pressure sensors (12, 12) are disposed on the upstream side and the downstream side of the DPF (5), the method comprising:

a step (a step S1) of comparing a differential pressure between the upstream side and the downstream side of the DPF (5) obtained by the pressure sensors (12, 12) with a threshold value and determining whether regeneration of the DPF (5) is required or not;

a step (a step S2) of determining whether a vehicle is traveling on cruise control or not (an auto cruise operation switch 13 is operated) from an operation state of an operation device (the auto cruise operation switch 13) that enables the vehicle to travel on cruise control;

a step (a step S3) of comparing an exhaust temperature detected by the exhaust temperature sensor (11) with a threshold value;

a step (a step S4) of injecting the fuel into the exhaust pipe (3) by the fuel injection means (7) when the DPF (5) must be regenerated (YES at the step S1), the vehicle is traveling on cruise control (the auto cruise operation switch 13 is operated) (YES at the step S2), and the exhaust temperature detected by the exhaust temperature sensor (11) is higher than a threshold value (YES at the step S3); and a step (a step S5) of operating an exhaust brake when the DPF (5) must be regenerated (YES at the step S1) and the vehicle is traveling on cruise control (YES at the step S2) but the exhaust temperature is lower than the threshold value (NO at the step S3).

Advantageous Effects of invention

As described above, in the prior art, since an engine load of a vehicle is not fixed during travel of the vehicle according to the technology for raising an exhaust temperature to regenerate a DPF by injecting the fuel into the exhaust pipe (3), stably raising the exhaust temperature is difficult.

On the other hand, according to the present invention, the fuel is injected into the exhaust pipe by the fuel injection means (7) only when the vehicle is traveling on cruise control (the auto cruise operation switch 13 is operated). Here, since travel is carried out at a constant speed on cruise control irrespective of a driver's pedal operation, a load variation in the vehicle engine is small, stable combustion is enabled, and hence the exhaust temperature is kept constant in the exhaust pipe. Therefore, as different from the technology for injecting the fuel into the exhaust pipe to regenerate the DPF, by detecting auto cruise travel during travel of the vehicle, the engine load of the vehicle is fixed even during travel of the vehicle, and the exhaust temperature can be stably raised. Thus, the DPF can be regenerated during travel of the vehicle (traveling on cruise control) as well as stoppage of the vehicle.

Moreover, according to the present invention, if the exhaust temperature is lower than a threshold value even though the vehicle is traveling on cruise control, the exhaust brake is operated to raise the exhaust temperature (without injecting the fuel, into the exhaust pipe). As a result, the exhaust temperature can be raised to a level that enables regeneration of the DPF.

Consequently, when the exhaust temperature is raised and regeneration of the DPF is required even during travel of the vehicle, the DPF can be stably regenerated. As a result, the DPF does not have to be frequently regenerated when the vehicle is stopped. Additionally, the exhaust brake can be automatically operated in tandem with determination on whether regeneration of the DPF is necessary or not, and a driver's operation is not required. That is, the DPF regeneration enables preventing the driver's fatigue from increasing without unnecessary operations of the driver.

DESCRIPTION OF EMBODIMENTS

An embodiment according to the present invention will now be described with reference to the accompanying drawings hereinafter.

Figure 1:
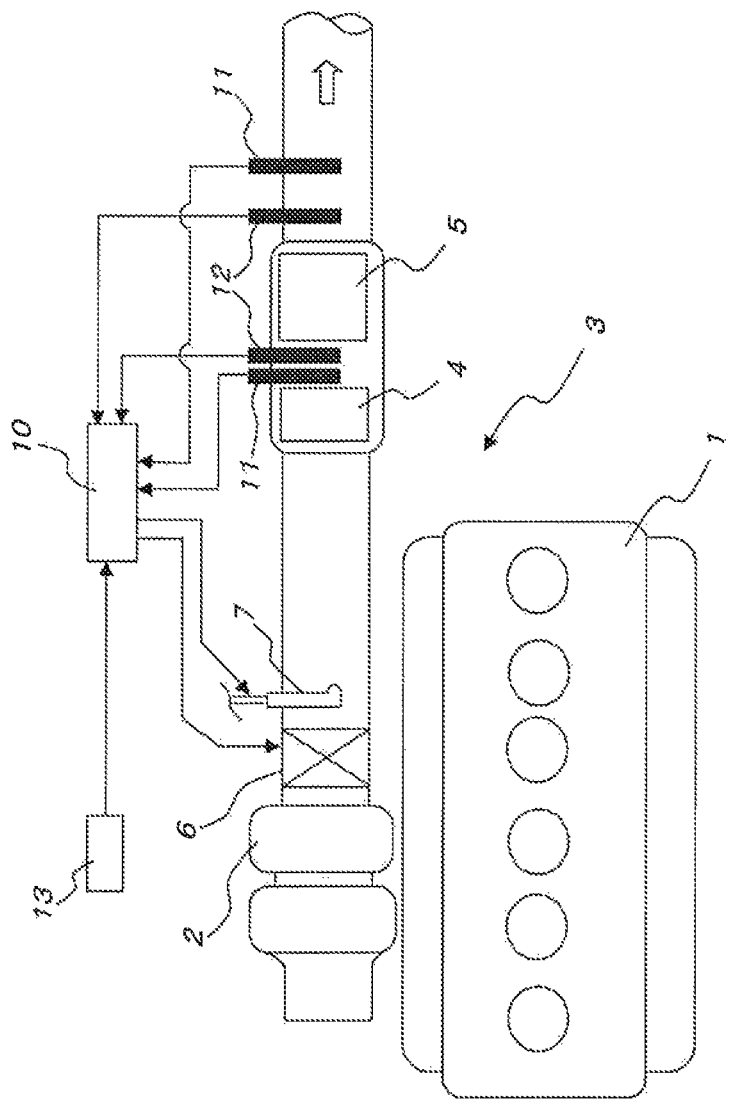
FIG. 1 is a block diagram of an embodiment according to the present invention.

FIG. 1 shows a configuration of a DPF regeneration control system according to the present invention. It is to be noted that a vehicle having this system mounted therein is equipped with an auto cruise (constant-speed travel) control device, but the illustration of the auto cruise control device is omitted in FIG. 1.

In FIG. 1, an exhaust pipe 3 extends from an engine 1 through a turbo charger 2.

In the exhaust pipe 3, an exhaust brake 6 is disposed in a region on a downstream side (a right-hand side in FIG. 1) of the turbo charger 2, and an oxidation catalyst 4 and a DPF 5 are integrally disposed on the downstream side of the exhaust brake 6. Further, in the an pipe 3, a fuel injection means 7 (a device that injects fuel into the exhaust pipe 3: e.g., a nozzle) is disposed in a region on the downstream side of the exhaust brake 6. It is to be noted that a relative positional relationship between the fuel injection means 7 and the exhaust brake 6 is not restricted to the conformation shown in FIG. 1.

In the exhaust pipe 3, exhaust temperature sensors 11, 11 are disposed in a region between the oxidation catalyst 4 and the DPF 5 (a region on an upstream side of the DPF 5) and a region on the downstream side of the DPF 5, respectively. Although not shown, the exhaust temperature sensor 11 may be disposed in the region between the oxidation catalyst 4 and the DPF 5 alone (the region on the upstream side of the DPF 5).

Pressure sensors 12, 12 are disposed on the upstream side and the downstream side of the DPF 5, respectively. It is possible to detect a pressure difference between the upstream side and the downstream side of the DPF 5 based on a difference between a measurement value of the pressure sensor 12 on the upstream side of the DPF 5 and a measurement value of the pressure sensor 12 on the downstream side of the DPF 5.

The exhaust temperature sensors 11, 11 and the pressure sensors 12, 12 are connected to a control unit 10 through signal transmission lines, and respective detection signals are input to the control unit 10.

The control unit 10 is also connected to an auto cruise operation switch 13 (an operation device that enables a vehicle to travel on cruise control) and information showing whether the vehicle is traveling on cruise control or not is input to the control unit 10.

The control unit 10 is connected to control devices of the fuel injection means and the exhaust brake 6 through the signal transmission lines and has a function for outputting control signals to the respective devices.

Figure 2:
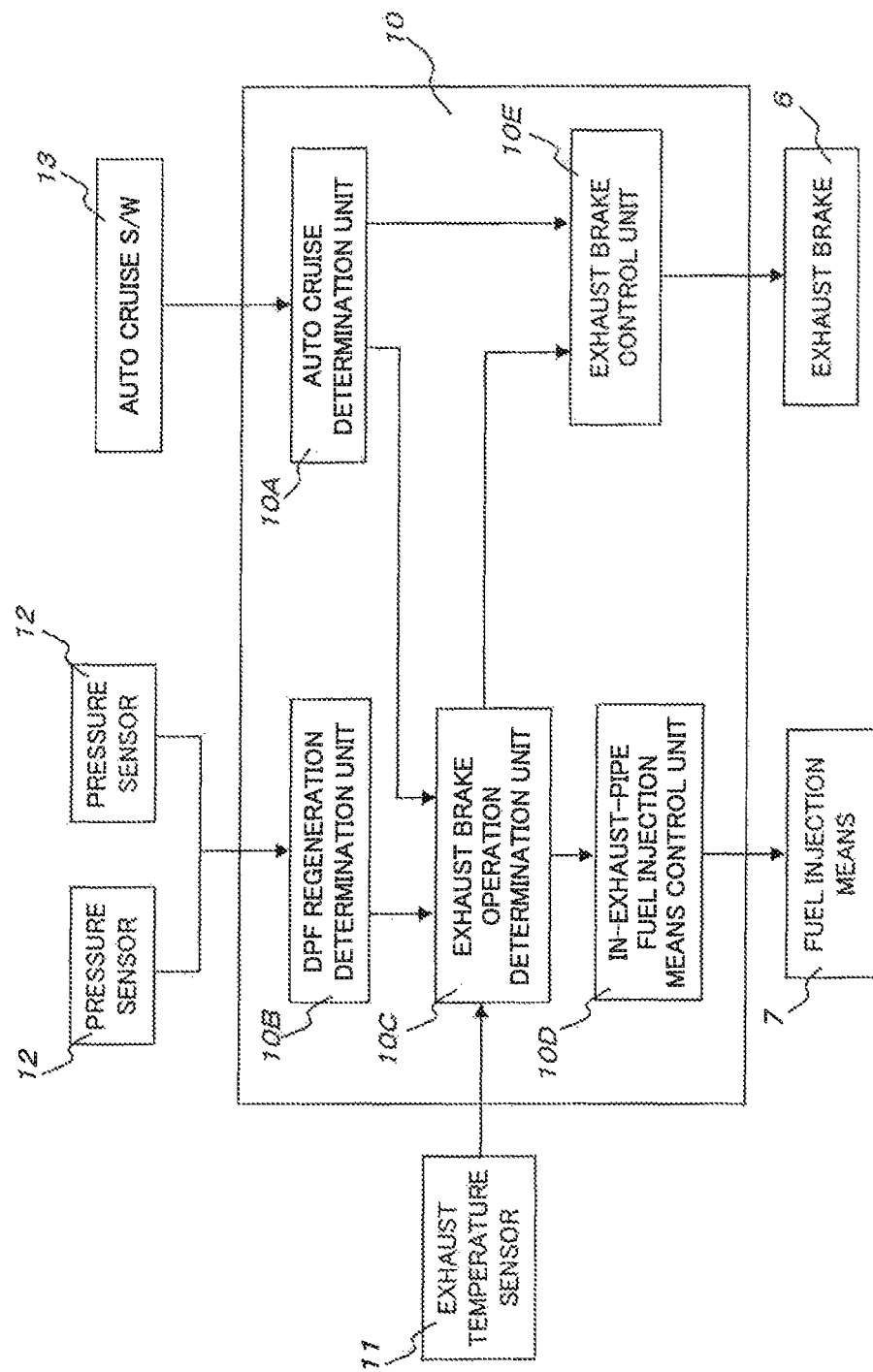
FIG. 2 is a block diagram of a control unit according to the embodiment.

In FIG. 2, particulars of the control unit 10 are shown as a functional block diagram.

The auto cruise operation switch 13 is connected to an auto cruise determination unit 10A in the control unit 10 through the signal transmission line. The auto cruise determination unit 10A outputs a signal concerning whether the vehicle is traveling on cruise control or not (an auto cruise operation signal) to an exhaust brake operation determination unit 10C in response to a signal from the auto cruise operation switch 13 (a signal indicating whether the vehicle is traveling on cruise control or not).

Furthermore, the pressure sensors 12, 12 are connected to a DPF regeneration determination unit 10B through signal transmission lines. The DPF regeneration determination unit 10B has a function to calculate a pressure difference between the upstream side and the downstream side of the DPF 5 based on a difference between measurement values of the pressure sensors 12, 12 and determine whether the DPF must be regenerated or not based on the calculated pressure difference. Moreover, the DPF regeneration determination unit 10B outputs a determination result representing whether the DPF must be regenerated or not (a regeneration determination signal) to the exhaust brake operation determination unit 10C.

Each exhaust temperature sensor 11 is connected to the exhaust brake operation determination unit 10C through the signal transmission line. The exhaust brake operation determination unit 10C receives an exhaust temperature measured by the exhaust temperature sensor 11, an operation signal from the auto cruise determination unit 10A, and a regeneration determination signal from the DPF regeneration determination unit 10B and outputs a control signal to a fuel injection means control unit 10D or an exhaust brake control unit 10E.

As will be described later in detail with reference to FIG. 3, when the exhaust brake operation determination unit 10C receives an auto cruise operation signal indicating that the vehicle is traveling on cruise control and also receives a regeneration determination signal indicating the need for regenerating the DPF 5 and the exhaust temperature measured by the exhaust temperature sensor 11 is a high temperature (higher than a threshold value), the exhaust brake operation determination unit 10C outputs a control signal for injecting fuel into the exhaust pipe 3 by the fuel injection means 7 to the fuel injection means control unit 10D. In such a case, the control signal is not output to the exhaust brake control unit 10E.

On the other hand, when the exhaust brake operation determination unit 10C receives the auto cruise operation signal indicating that the vehicle is traveling on cruise control and also receives the regeneration determination signal indicating the need for regenerating the DPF but the exhaust temperature measured by the exhaust temperature sensor 11 is a low temperature (lower than the threshold value), the exhaust brake operation determination unit 10C outputs a control signal for operating the exhaust brake 6 to the exhaust brake control unit 10E. In such a case, the control signal is not output to the fuel injection means control unit 10D.

The control in the illustrated embodiment will now be described with reference to FIG. 3.

Figure 3:
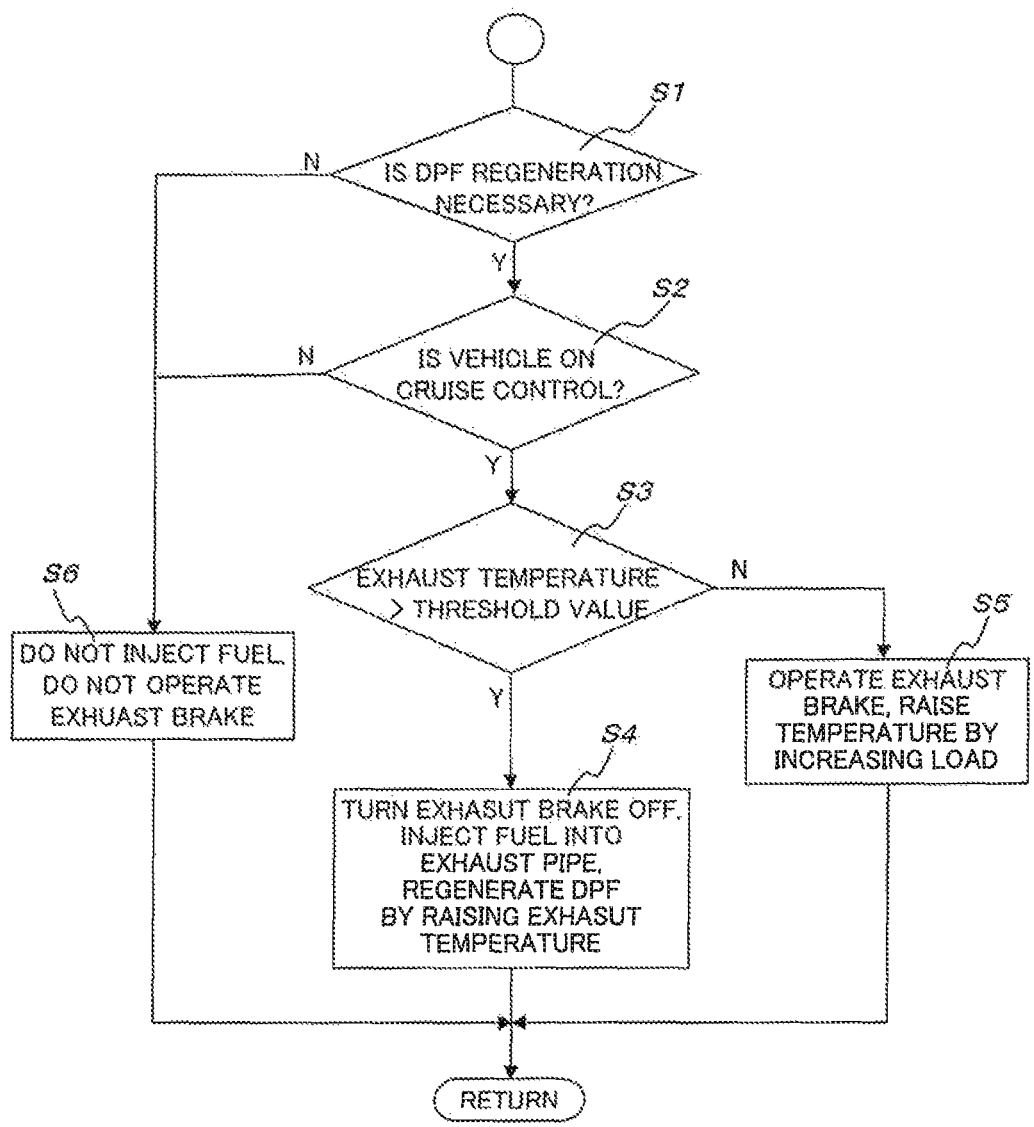
FIG. 3 is a flowchart showing control according to the embodiment.

At a step S1 in FIG. 3, whether regeneration of the DPF 5 is required or not is determined based on a differential pressure between the upstream and downstream sides of the DPF in the DPF regeneration determination unit 10B. For example, when a pressure difference between the upstream side and the downstream side of the DPF 5 is calculated from measurement values of the pressure sensors 12, 12, the calculated pressure difference is compared with a threshold value, and the pressure difference is higher than the threshold value, it is determined that the DPF 5 must be regenerated (Y at the step S1), and the processing advances to a step S2.

On the other hand, when the pressure difference is equal to or less than the threshold value, it is determined that the DPF 5 does not have to be regenerated (N at the step S1), and the processing advances to a step S6.

Here, the threshold value is set in accordance with specifications of the non-illustrated vehicle, characteristics of the DPF 5, traveling conditions, and others on a case-by-case basis.

At the step S2 (when it was determined that "the DPF must be regenerated" at the step S1), the auto cruise determination unit 10A (refer to FIG. 2) determines whether the vehicle is traveling on cruise control, or not. That is, whether the vehicle is traveling on cruise control or not is determined based on a signal from the auto cruise operation switch 13 (the signal indicating whether the vehicle is traveling on cruise control or not).

When the auto cruise operation switch 13 is operated (the auto cruise operation switch 13 is ON), it is determined that the vehicle is traveling on cruise control (Y at the step S2) and the processing advances to a step S3.

On the other hand, when the auto cruise operation switch 13 is not operated (the auto cruise operation switch 13 is OFF), it is determined that the vehicle is not traveling on cruise control (N at the step S2), and the processing advances to a step S6. Since an engine load of the vehicle is not constant when the vehicle is not traveling on cruise control, the fuel is not injected into the exhaust pipe 3 in order to avoid a situation where the exhaust temperature is not increased even though the fuel is injected into the exhaust pipe 3 or that the exhaust temperature is excessively increased.

At the step S3 (when it was determined that the vehicle is traveling on cruise control), whether the exhaust temperature detected by the exhaust temperature sensor 11 is higher than a threshold value or not is determined.

If the exhaust temperature is higher than the threshold value (Y et the step S3), the processing advances to a step S4. At the step S4, since the vehicle is traveling on cruise control (Y at the step S1), regeneration of the DPF 5 is determined to be needed (Y at the step S2), the exhaust temperature measured by the exhaust temperature sensor 11 is a high temperature (Y at the step S3), and hence it is determined that regeneration of the DPF 5 is enabled by injecting the fuel into the exhaust pipe 3. Further, the exhaust brake operation determination unit 10C (FIG. 2) outputs the control signal to the fuel injection means control unit 10D (FIG. 2) and injects the fuel into the exhaust pipe 3 by the fuel injection means 7 (in-exhaust-pipe fuel injection is carried out). In this case, the control signal is not output to the exhaust brake control unit 10E, and the exhaust brake 6 is not operated (the exhaust brake OFF).

When the fuel is injected into the exhaust pipe 3 by the fuel injection means 7, the exhaust temperature in the exhaust pipe 3 increases by the injected fuel, and the DPF 5 is regenerated (DPF is regenerated by the increase in exhaust temperature). Furthermore, the processing returns to the step S1.

On the other hand, if the exhaust temperature is a low temperature equal to or less than the threshold value (N at the step S3), the processing advances to a step S5. At the step S5, although the vehicle is traveling on cruise control (Y at the step S1) and regeneration of the DPF 5 is determined to be needed (Y at the step S2), the exhaust temperature measured by the exhaust temperature sensor 11 is a low temperature, and regeneration of the DPF 5 is impossible, and hence it is determined that the exhaust temperature must be raised. Therefore, the exhaust brake operation determination unit 10C (FIG. 2) outputs a control signal for operating the exhaust brake 6 to the exhaust brake control unit 10E, but the control signal is not output to the fuel injection device control unit 10D, and the fuel is not injected into the exhaust pipe 3.

Operating the exhaust brake 6 enables increasing the engine load of the vehicle to boost an amount of fuel supply to the engine and raising the exhaust temperature. Moreover, the processing returns to the step S1.

The threshold value of the exhaust temperature should be set in accordance with specifications of the vehicle, characteristics of the DPF 5, and others on a case-by-case basis.

It is to be noted that, when the exhaust temperature increases to be higher than the threshold value as a result of operating the exhaust brake (Y at the step S3), the exhaust brake 6 enters a non-operating state, and the fuel is injected into the exhaust pipe 3 (the step S4).

If regeneration of the DPF is determined to be unnecessary at the step S1 (N at the step S1) or if the vehicle is not traveling on cruise control at the step S2 (N at the step S2), regeneration of the DPF 5 is not performed, and both the fuel injection 7 and the exhaust brake 6 do not operate (the step S6). Additionally, the processing returns to the step S1.

According to the illustrated embodiment, when the auto cruise operation switch 13 is operated (the auto cruise operation switch 13 is ON), a relatively stable traveling state of the vehicle is detected (Y at the step S2), and the exhaust temperature is high (Y at the step S3), the fuel is injected into the exhaust pipe 3 to regenerate the DPF 5. Therefore, even if the vehicle is traveling, the DPF 5 can be regenerated by injecting the fuel into the exhaust pipe 3.

Here, if the exhaust temperature is low (N at the step S3), the engine load is increased by operating the exhaust brake 6, and the exhaust temperature is thereby raised. Further, when the exhaust temperature is raised to a level that is sufficient for regeneration of the DPF 5 (a temperature higher than the threshold value), the fuel is injected into the exhaust pipe 3 to regenerate the DPF 5.

Therefore, even though the DPF 5 is regenerated by injecting the fuel into the exhaust pipe 3, it is possible to execute the DPF regenerating operation during travel of the vehicle.

It is stated that the illustrated embodiment is just an illustrative example and it is not a description that is intended to restrict the technical scope of the present invention.

EXPLANATIONS OF LETTERS OR NUMERALS

1 . . . engine
2 . . . turbo charger
3 . . . exhaust pipe
4 . . . oxidation catalyst
5 . . . diesel particulate filter (DPF)
6 . . . exhaust brake
7 . . . fuel injection means
10 . . . control unit
11 . . . exhaust temperature sensor
12 . . . pressure sensor
13 . . . auto cruise operation switch

The invention claimed is:

1. A DPF regeneration system based on in-exhaust-pipe fuel injection in a diesel engine equipped vehicle, the DPF regeneration system comprising:
   an an auto cruise operation switch that enables a vehicle to travel on cruise control, an exhaust brake and a fuel injector being disposed to the exhaust pipe,
   a DPF being disposed in a region on the downstream side of the fuel injection means,
   an exhaust temperature sensor being disposed in a region on the upstream side of the DPF,
   pressure sensors being disposed on the upstream side and the downstream side of the DPF, and
   a control unit that controls the exhaust brake and the fuel injection means in response to detection signals from the exhaust temperature sensor and the pressure sensors, wherein the control unit has:
   a function to inject fuel into the exhaust pipe by the fuel injector when a differential pressure between the upstream side and the downstream side of the DPF measured by the pressure sensors is equal to or more than a first threshold value, the vehicle is traveling on cruise control, and an exhaust temperature detected by the exhaust temperature sensor is higher than a second threshold value; and
   a function to operate the exhaust brake when the differential pressure is equal to or more than the first threshold value and the vehicle is traveling on cruise control but the exhaust temperature is lower than the second threshold value.

2. A DPF regeneration method based on in-exhaust-pipe fuel injection in a diesel engine equipped vehicle in which an exhaust brake and a fuel injection means are disposed to the exhaust pipe, a DPF is disposed in a region on the downstream side of the fuel injection means, an exhaust temperature sensor is disposed in a region on the upstream side of the DPF, and pressure sensors are disposed on the upstream side and the downstream side of the DPF, the method comprising:
   a step of comparing a differential pressure between the upstream side and the downstream side of the DPF obtained by the pressure sensors with a first threshold value and determining whether regeneration of the DPF is required or not;
   a step of determining whether a vehicle is traveling on cruise control or not from an operation state of an operation device that enables the vehicle to travel on cruise control;
   a step of comparing an exhaust temperature detected by the exhaust temperature sensor with a second threshold value;
   a step of injecting the fuel into the exhaust pipe by the fuel injection means when the DPF must be regenerated, the vehicle is traveling on cruise control, and an exhaust temperature detected by the exhaust temperature sensor is higher than the second threshold value; and
   a step of operating an exhaust brake when the DPF must be regenerated and the vehicle is traveling on cruise control but the exhaust temperature is lower than the second threshold value.

* * * * *